United States Patent
Stoev

(10) Patent No.: US 9,431,898 B2
(45) Date of Patent: Aug. 30, 2016

(54) BIDIRECTIONAL DC-TO-DC CONVERTER

(71) Applicant: Alexander Stoev, Forch (CH)

(72) Inventor: Alexander Stoev, Forch (CH)

(73) Assignee: Woodward IDS Switzerland AG, Zurich (CH)

( * ) Notice: Subject to any disclaimer, the term of this patent is extended or adjusted under 35 U.S.C. 154(b) by 694 days.

(21) Appl. No.: 13/741,747

(22) Filed: Jan. 15, 2013

(65) Prior Publication Data

US 2013/0207470 A1    Aug. 15, 2013

Related U.S. Application Data

(63) Continuation of application No. PCT/CH2010/000251, filed on Oct. 12, 2010.

(30) Foreign Application Priority Data

Jul. 15, 2010   (CH) .................... 01156/10

(51) Int. Cl.
  *H02M 3/04*   (2006.01)
  *H02M 3/158*  (2006.01)
  *H02J 3/32*   (2006.01)
  *H02J 3/38*   (2006.01)
  *H02J 7/35*   (2006.01)
  *H02M 1/00*   (2006.01)

(52) U.S. Cl.
  CPC ............. *H02M 3/04* (2013.01); *H02M 3/158* (2013.01); *H02J 3/32* (2013.01); *H02J 3/383* (2013.01); *H02J 7/35* (2013.01); *H02M 2001/007* (2013.01); *H02M 2001/0074* (2013.01); *Y02E 10/563* (2013.01); *Y02E 10/566* (2013.01); *Y10T 307/50* (2015.04)

(58) Field of Classification Search
  CPC ............. H02M 3/04; H02M 3/158; H02M 2001/007; H02M 2001/0074; H02J 3/32; H02J 3/35; H02J 3/383; Y10T 307/50; Y02E 10/563; Y02E 10/566
  USPC ........................................... 307/78
  See application file for complete search history.

(56) References Cited

U.S. PATENT DOCUMENTS

| | | | | |
|---|---|---|---|---|
| 6,151,234 A | * | 11/2000 | Oldenkamp | H02M 7/483 323/268 |
| 2010/0019754 A1 | * | 1/2010 | Schreiber | H02M 7/48 323/311 |
| 2010/0072819 A1 | * | 3/2010 | Lee | H02M 3/1582 307/77 |
| 2010/0133904 A1 | | 6/2010 | Klodowski et al. | |

FOREIGN PATENT DOCUMENTS

| | | |
|---|---|---|
| DE | 10136147 A1 | 2/2003 |
| DE | 10200437446 A1 | 6/2006 |
| DE | 102008059330 A1 | 6/2010 |
| EP | 2148419 A2 | 1/2010 |
| EP | 2173024 A2 | 4/2010 |
| JP | 9261949 A | 10/1997 |
| KR | 20090128973 A | 12/2009 |
| WO | 2006011071 A2 | 2/2006 |
| WO | 2010069620 A1 | 6/2010 |

OTHER PUBLICATIONS

Hashimoto, Osamu et al., A Novel High Performance Utility Interactive Photovoltaic Inverter System, Industry Applications Conference, IEEE Oct. 8-12, 2000, pp. 2255-2260, vol. 4, XP010522571, Piscataway, NJ, USA.

* cited by examiner

*Primary Examiner* — Thienvu Tran
*Assistant Examiner* — Kevin J Comber
(74) *Attorney, Agent, or Firm* — Maginot, Moore & Beck LLP

(57) ABSTRACT

A bidirectional DC-to-DC converter is configured to convert electrical energy from a first and second DC source. The bidirectional converter includes an output capacitor providing an output voltage and a first and second inductor. The first inductor is arranged between a positive connection of the second DC source and a first contact of a first switch. The second inductor is arranged between a negative connection of the first DC source and a second contact of the first switch. A buffer capacitor is arranged between a negative output of the first DC source and a positive output of the second DC source. A second and third switch are arranged in series with the first switch. The second switch is arranged between the first contact of the first switch and the positive DC output. The third switch is arranged between the second contact of the first switch and the negative DC output.

9 Claims, 5 Drawing Sheets

PRIOR ART

PRIOR ART

BIDIRECTIONAL DC-TO-DC CONVERTER

CROSS-REFERENCE TO RELATED APPLICATIONS

This application is a continuation of international patent application no. PCT/CH2010/000251, filed Oct. 12, 2010, and published as WO 2012/006746, which international patent application claims priority from Switzerland patent application no. 01156/10, filed Jul. 15, 2010.

FIELD

The present disclosure relates to the field of power electronics and more particularly relates to a bidirectional DC-to-DC converter.

BACKGROUND

Conventional DC sources comprise, for example, batteries or a number of solar panels, which are connected in series to form so-called strings, with the result that the string voltage Ust corresponds to the sum of the voltages (DC source voltages Ust1, Ust2) of the number of series-connected solar panels (DC sources). A string loaded by a consumer produces a string current (Ist) and a string power (Ppv). A loading apparatus for the string is also referred to as a tracker and is often implemented by an electronic step-up converter. The step-up converter (tracker) ideally sets the string current Ist such that the maximum energy can be generated by the string; this working point is referred to as the "maximum power point" (MPP). Such maximum power point step-up converters (MPP trackers) are designed to step-up the string voltage Ust such that the string voltage Ust results in a constant output voltage Udc of the step-up converter (also referred to as "booster"). As is known, the DC source voltages Ust1, Ust2 have a high degree of variance; the level of the DC source voltage Ust1, Ust2 is firstly dependent on the temperature of the solar panels and secondly on the density of the solar radiation—the lower the temperature of the cells and the higher the density of the radiation, the higher the voltage of individual solar cells and therefore of the DC source voltages Ust1, Ust2. The DC source voltages Ust1, Ust2 vary from −40% to +40% of their rated value during operation.

A DC-to-AC convertor connected downstream of the step-up converter converts the output voltage Udc at its input into an AC voltage suitable for power supply systems at its output with an rms value Uac. The DC-to-AC converter feeds the energy from the DC sources into the power supply system, provided that the output voltage Udc of the step-up converter fulfills the following condition $$Udc > \sqrt{2} * Uac = 1.42 * Uac;$$

where Udc is the output voltage of the step-up converter, and Uac is the rms value of the system voltage of the power supply system.

If the energy emission of a DC source, for example a solar panel, is disregarded or if a DC source, for example battery, is partially discharged, step-up converters are required in order to raise the output voltage Udc to the required value in order that a feed into the power supply system via the DC-to-AC converter is still possible.

Design and mode of operation of conventional step-up converters:

A conventional step-up converter 2, as illustrated by way of example in FIG. 1, for stepping up the DC source voltage of a DC source 1 substantially comprises a storage inductor 2.4, an electronic switch 2.7, a diode 2.6 and an output capacitor 2.9. In this case, the electronic switch 2.7 is formed from a transistor with an anti-parallel diode. Examples of such step-up converters can be found under the designation "Aufwärtswandler" [step-up converters] on the German version of "www.wikipedia.org" or in a text entitled "Vorlesung Schaltnetzteile" [Switched mode power supplies lecture] by Prof. Schmidt-Walter, Darmstadt High School, Germany (http://schmidt-walter.eit.h-da.de/smps/smps.html).

The DC source voltage Ust of the DC source is lower than the output voltage Udc across the output capacitor 2.9. When the switch 2.7 is switched on, a current Ist flows into the storage inductor 2.4, the corresponding energy of the current Ist is stored in the storage inductor 2.4.

Then, the switch 2.7 opens and the stored energy in the storage inductor 2.4 is introduced into the output capacitor 2.9 via the diode 2.6; the DC current Idc is flowing. The output capacitor 2.9 is also referred to as a DC bus capacitor. The output current Idc is controlled by the switching-on and switching-off (modulation) of the switch (2.7) (pulse-width modulation PWM).

Design and mode of operation of conventional step-down converters:

The design of a step-down converter as shown in FIG. 2 can be found under the designation "Abwärtswandler" [step-down converters] at the German version of "www.wikipedia.org" or in a text entitled "Vorlesung Schaltnetzteile" [Switched mode power supplies lecture] by Prof. Schmidt-Walter, Darmstadt High School, Germany (http://schmidt-walter.eit.h-da.de/smps/smps.html).

In contrast to the previously described step-up converter, known step-down converters 20 have, on the input side, a DC source 1 and, in parallel with this, a switch 2.7 in series with a diode 2.6; a storage inductor 2.4 and an output capacitor 2.9 are arranged in series, in parallel with this diode 2.6. The DC source voltage Ust of the DC source of the step-down converter 20 is greater than the output voltage Udc across the capacitor 2.9. When the switch 2.7 is switched on, a current flows into the storage inductor 2.4, and the energy corresponding to this current is stored in the storage inductor. Then, the switch 2.7 opens and the stored energy is introduced into the capacitor 2.9 via the diode 2.6.

Design and Mode of Operation of Conventional Bidirectional DC-to-DC Converters

By virtue of the combination of the circuits of a step-up converter (FIG. 1) and a step-down converter (FIG. 2), the design of known bidirectional DC-to-DC converters as shown in FIG. 3 is provided. Such DC-to-DC converters comprise a first capacitor 2.2 and a second capacitor 2.9, which, depending on the direction of energy flow, act as DC source and output capacitor or as output capacitor and DC source. A first switch 2.60 and a second switch 2.70 are connected in series and are arranged in parallel with the second capacitor 2.9. A series circuit comprising a storage inductor 2.4 and the first capacitor 2.2 is arranged in parallel with the first switch 2.60. The two switches 2.60 and 2.70 are constructed from transistors with anti-parallel diodes. As a result, the bidirectional DC-to-DC converter can convert energy in both directions between the first and second capacitors 2.2 and 2.9. In the case of such DC-to-DC converters, it can be considered disadvantageous that the total energy is converted by the switches 2.60 and 2.70 and the storage inductor 2.4 needs to store the total energy during the conversion.

The literature discloses many variants of such DC-to-DC converters which all have the common feature that the total energy is converted via switches and storage inductors: thus, DE 10 2004 037 446 B4 (transformerless inverter for solar system feed) provides a representative prior art with respect to step-up converters. In this case, a symmetrical DC-to-DC converter is shown which is similar to that in FIG. 3 and which nevertheless converts the total DC source voltage. The output capacitor 2.9 is in this case divided into two series-connected output capacitor elements, the central point of which is grounded.

WO 2006/011071 (3-phase Solar Converter Circuit and Method) contains a step-up converter with a conventional design for the total DC source power, wherein in this case the emphasis is on the activation of the line converter.

EP 2 148 419 A2 (Power converter arrangement for solar power installations and actuation method therefor) describes a symmetrical step-up converter (similar to that in DE 10 2004 037 446 B4). KR 2009 0128973 is concerned with further different circuit arrangements for step-up converters.

DE 10 2008 059330 (Compact three-phase inverter with upstream integrated step-up converter) describes an inverter unit with input step-up converters for solar applications. The step-up converter has a conventional design; the actual subject matter of this document consists in different configurations for the inverter.

Document US 2010 133904 (DC bus voltage control for two stage solar converter) comprises the entire arrangement of step-up converter with downstream DC-to-AC converter, wherein the step-up converter likewise converts the total power.

All of the step-up converters proposed here have the common feature that they can comprise large and complex circuits, have an undesirably high amount of energy losses, namely approximately 2% of the solar energy in such step-up converters is lost, wherein these energy losses which occur in the form of heat also need to be dissipated via corresponding cooling systems.

EP 2 173 024 A2 proposes an arrangement for the unipolar stepping-up of the DC source voltage from two DC sources using one step-up converter, as shown by way of example in FIG. 4, wherein this step-up converter requires two symmetrical storage inductors 2.4 and 2.5 and two diodes 2.6 and a unipolar switch 2.71. A first DC source 1.1 and a second DC source 1.2 are connected in series via a switch 2.71. The switch 2.71 is connected on both sides to the two diodes 2.6 to form a DC output 3.1, 3.2, wherein this DC output is supported by an output capacitor 2.9.

The current which flows when switch 2.71 is switched on is unipolar and is stored in the storage inductors 2.4, 2.5. When the switch 2.71 opens, the current stored in the storage inductors passes via the two diodes 2.6 to the DC output; in addition, a unipolar direct current flows parallel from the DC sources 1.1, 1.2 directly to the DC output 3.1, 3.2. The switch 2.71, the diodes 2.6 and the storage inductors 2.4, 2.5 thus only conduct part of the total direct current, the other part passes directly to the DC output. Therefore, up to 50% of the losses can be saved, with the result that the storage inductors 2.4, 2.5, the diodes 2.6 and the switch 2.71 can have smaller dimensions both electrically and also physically. On the other hand, harmonics, electromagnetic radiation, and the limited voltage range during operation as a step-up converter can be considered to be disadvantageous.

When the switch 2.71 switches, high-frequency AC voltages with the amplitude of the DC voltage arise. When the DC sources comprise solar panels, parasitic voltages with amplitudes of 1000 V and frequencies in the kHz range can occur, which cannot be withstood by most solar panels. Since the feed lines between the DC sources 1.1, 1.2 and the step-up converter 2 can be long, in this case unfiltered high-frequency currents and voltages in these feed lines result in undesired electromagnetic interference (EMC) in the surrounding environment. In addition, this step-up converter can only function when the sum of the two DC source voltages Ust1 and Ust2 is greater than or equal to the output voltage Udc. If the current flow reverses in the case of a relatively low total DC source voltage, the diodes 2.6 cannot take over the current, and the conversion stops. In addition, the voltage across the switch 2.71 is in this case likewise reversed. In this operating case, the switch 2.71 cannot be controlled; it is either switched on permanently or switched off permanently.

If a plurality of DC sources in the form of solar panels or series-connected solar panels (strings) are connected in parallel to form a so-called multi-string, the same output voltage Udc will be imposed on all of the solar panels or strings. During operation of a multi-string, however, shadowing or failure of individual solar panels can result in the entire affected multi-string being shut down, i.e. significant power failures result. It is even possible for energy from adjacent solar panels to be fed back to a shadowed solar panel. By shadowing and by aging of individual solar panels, the working points "maximum power points" (MPP) of the individual solar panels already mentioned above can deviate from one another. These deviations cannot be taken into consideration individually in the case of multi-strings, however, since no regulation of the power of individual solar panels is provided. A solution to this problem would be to assign a step-up converter to each individual solar panel or string, which appears to be impracticable for reasons of cost. In addition, the step-up converters have up to 1.5% of the rated power as losses, which means that a large amount of solar energy is consumed and, in addition, complex temperature management is required. One example of such a circuit is disclosed in DE 101 36 147 B4 (photovoltaic AC generator).

JP 9261949 (DC/DC Converter and Solar Generation System) deals with the problem that multi-strings can have different numbers of solar panels, or solar panels become ineffective as a result of shadowing, such that a "further" step-up converter is assigned to the multi-string with fewer solar panels, said "further" step-up converter matching the output voltage Udc correspondingly. With this arrangement, it is not possible to respond flexibly to temporarily different voltage ratios within a multi-string unless the "further" step-up converter is provided in all solar panels, which would increase the complexity correspondingly to an undesirable extent.

SUMMARY

In view of the foregoing, it would be desirable to provide a novel circuit arrangement which combines the properties of a step-up converter and a step-down converter for two DC sources and enables bipolar operation, wherein the disadvantages mentioned in the introductory part in relation to the prior art are intended to be eliminated; in this case both the harmonics with high voltage peaks and the electromagnetic radiation associated therewith of known circuits is intended to be considerably reduced and the undesired energy losses reduced.

In at least one embodiment, a bidirectional DC-to-DC converter for converting electrical energy from a first DC source and a second DC source comprises an output capacitor, wherein a positive contact of the first DC source is connected to a positive DC output of the bidirectional DC-to-DC converter and a connection of the output capacitor, and a negative contact of the second DC source is connected to a negative DC output of the bidirectional DC-to-DC converter and the second connection of the output capacitor, at which an output voltage Udc is present, wherein a first storage inductor is arranged between a positive connection of the second DC source and a first contact of a first electronic switch, and wherein the second storage inductor is arranged between a negative connection of the first DC source and a second contact of the first electronic switch.

A buffer capacitor is arranged between the negative output of the first DC source and the positive output of the second DC source, and that a second electronic switch and a third electronic switch are arranged in series with the first electronic switch, wherein the second electronic switch is arranged between the first contact of the first electronic switch and the positive DC output, and the third electronic switch is arranged between the second contact of the first electronic switch and the negative DC output.

This circuit arrangement for the bidirectional DC-to-DC converter is also referred to below as a differential converter or D converter.

Advantageously, the buffer capacitor and the output capacitor with the two storage inductors form a filter circuit, whereby, during operation of the differential converter, a significant reduction in current and voltage harmonics is achieved; this reduction in harmonics reduces known interference on the DC sources and in addition the EMC radiation output to the surrounding environment by conventional circuits. The power losses are lower in comparison with conventional circuits since only part of the DC power is passed via the storage inductors and the electronic switches, and a further part passes directly from the DC sources to the DC output. The series circuit comprising the buffer capacitor and the DC sources enables a voltage range which is extended in comparison with conventional circuits since, owing to the series circuit comprising the buffer capacitor and the DC sources, the sum of the DC source voltages can be less than or greater than the output voltage Udc.

The increased output voltage Udc possible owing to the extended voltage range enables an increased AC output voltage in an inverter circuit directed downstream of the differential converter as a result, which brings about a lower output current given the same output power; as a result, the power losses in transmission lines can also be reduced on the output side.

By switching on and off the first, second or third electronic switch, a differential voltage Ud across the buffer capacitor can be regulated, and a first DC current of the first DC source and a second DC current of the second DC source from the first and second DC source to the DC output or from the DC output to the first and second DC source can be set. Furthermore, the voltages Ust1, Ust2 of the first and second DC sources are variable from zero to the maximum value for the output voltage Udc and, in addition, an output current Idc at the positive or negative DC output, the first and second differential currents Id1, Id2 and the differential voltage Ud can assume positive or negative values.

Two additional capacitors, namely a first capacitor between the positive connection of the first DC source and the positive connection of the second DC source and a second capacitor between the negative connection of the first DC source and the negative connection of the second DC source, improve the filtering effect for the harmonics already mentioned above, in one embodiment of the arrangement described herein.

Further embodiments of the bidirectional DC-to-DC converter are the subject matter of the dependent claims and will be elucidated in more detail in the detailed description of the figures.

BRIEF DESCRIPTION OF THE FIGURES

Exemplary embodiments of a bidirectional DC-to-DC converter will be explained in more detail below with reference to the drawings, in which.

DETAILED DESCRIPTION

FIGS. 1 to 4 are known from the prior art and have already been acknowledged in the preceding introductory part.

Figure 1:
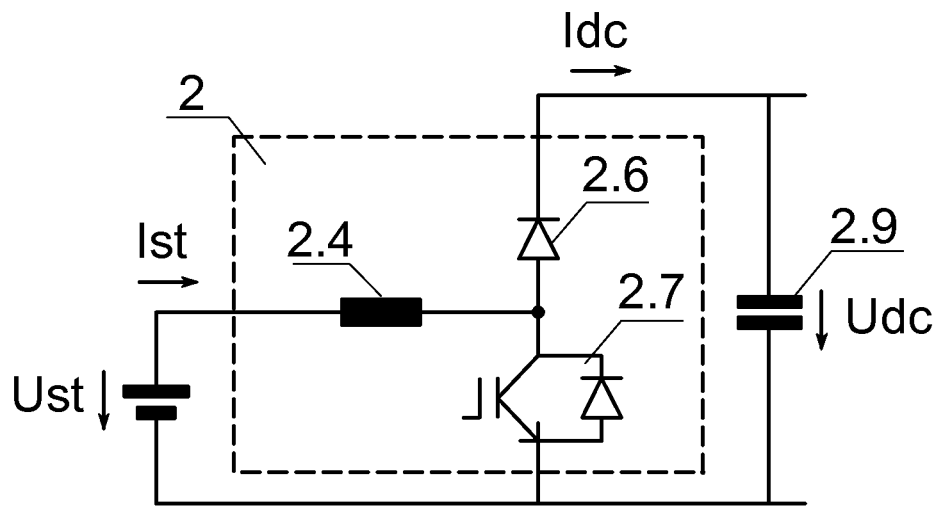
FIG. 1 shows a DC-to-DC step-up converter in accordance with the prior art.
Figure 2:
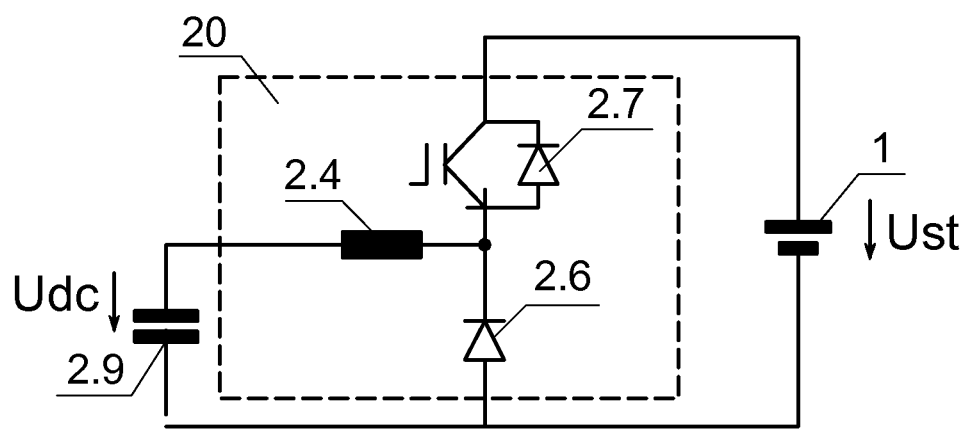
FIG. 2 shows a DC-to-DC step-down converter in accordance with the prior art.
Figure 3:
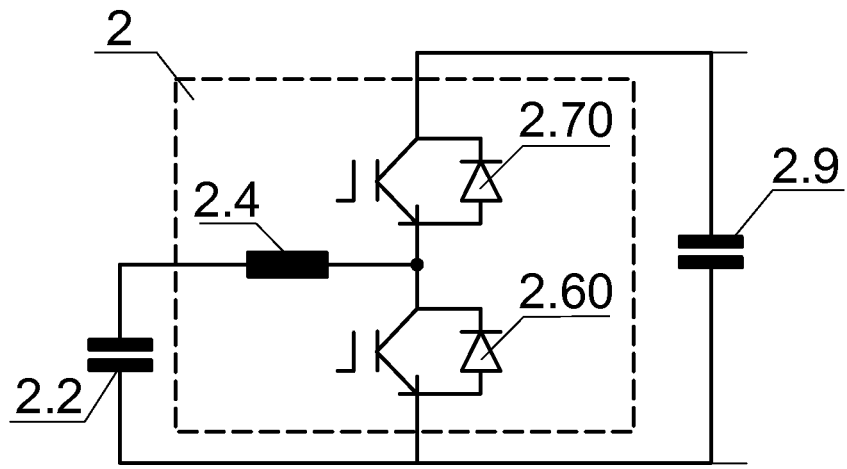
FIG. 3 shows a bidirectional DC-to-DC converter in accordance with the prior art.
Figure 4:
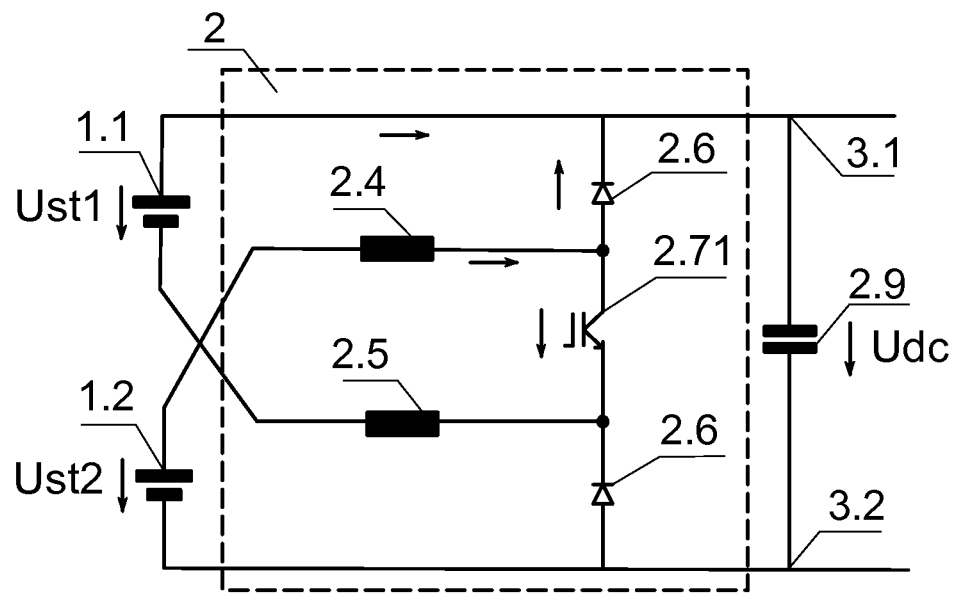
FIG. 4 shows a unipolar step-up converter for two DC sources in accordance with the prior art.
Figure 5:
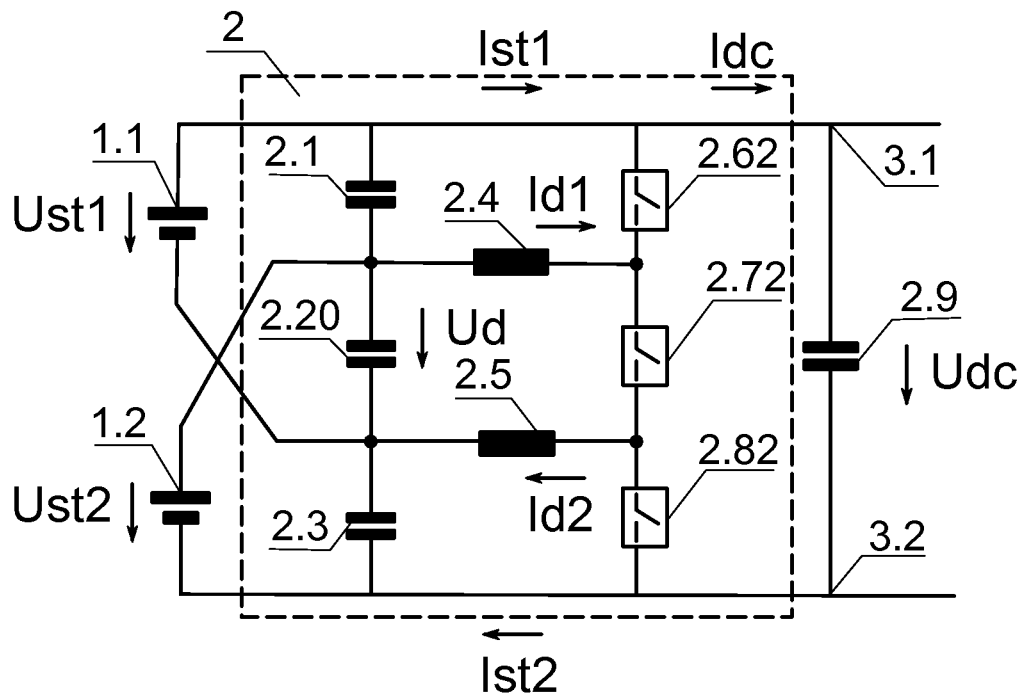
FIG. 5 shows an exemplary embodiment of a bidirectional DC-to-DC converter (differential converter, D converter)

FIG. 5 shows, with reference to a block circuit diagram, an embodiment of a bidirectional DC-to-DC converter for converting electrical energy. For this purpose, this bidirectional DC-to-DC converter (also referred to as differential converter below for short) has a first DC source 1.1 and a second DC source 1.2 on one side and an output capacitor 2.9 on the other side; although reference is made here to an output capacitor 2.9, this is not intended to mean that an energy flow direction is possible exclusively from the DC sources 1.1, 1.2 in the direction of the output capacitor 2.9; a reverse energy flow is possible as a result of corresponding regulation (described below) and in the case of an unchanged circuit arrangement, to be precise energy flow from the output capacitor 2.9 in the direction of the DC sources 1.1, 1.2.

A positive contact of the first DC source 1.1 is connected to a positive DC output 3.1 of the bidirectional DC-to-DC converter and a connection of the output capacitor 2.9, and a negative contact of the second DC source 1.2 is connected to a negative DC output 3.2 of the bidirectional DC-to-DC converter and the second connection of the output capacitor 2.9, at which an output voltage Udc is present.

In addition, the differential converter comprises a first and a second storage inductor 2.4, 2.5, wherein the first storage inductor 2.4 is arranged between a positive connection of the second DC source 1.2 and a first contact of a first electronic switch 2.72, and wherein the second storage inductor 2.5 is arranged between a negative connection of the first DC source 1.1 and a second contact of the first electronic switch 2.72.

A buffer capacitor 2.20 is arranged between the negative output of the first DC source 1.1 and the positive output of the second DC source 1.2, and a second electronic switch 2.62 and a third electronic switch 2.82 are arranged in series with the first electronic switch 2.72, wherein the second electronic switch 2.62 is arranged between the first contact of the first electronic switch 2.72 and the positive DC output 3.1, and the third electronic switch 2.82 is arranged between the second contact of the first electronic switch 2.72 and the negative DC output 3.2.

By switching on and switching off the first, second or third electronic switch 2.72, 2.62, 2.82, a differential voltage Ud across the buffer capacitor 2.20 can be regulated and, in addition, a first DC current Ist1 of the first DC source 1.1 and a second DC current Ist2 of the second DC source 1.2 from the first and second DC source 1.1, 1.2 to the DC output 3.1, 3.2 or from the DC output 3.1, 3.2 to the first and second DC source 1.1, 1.2 can be set. Furthermore, by controlling the differential voltage Ud of the buffer capacitor 2.20, a first differential current Id1 across the first storage inductor 2.4 and a second differential current Id2 across the second storage inductor 2.5 can be set.

Case A Step-up converter, input voltage greater than output voltage:

The differential voltage Ud is positive, i.e. the sum of the voltages of the two DC sources Ust1, Ust2 is greater than the output voltage Udc. When the first switch 2.72 is switched on, positive differential currents Id1 and Id2 flow, which are stored in the storage inductors 2.4, 2.5. When the first switch 2.72 is switched off, the second and third switches 2.62, 2.82 are switched on, and the differential currents Id1, Id2 stored in the storage inductors 2.4, 2.5 flow via the second and third switches 2.62, 2.82 to the output capacitor 2.9.

In parallel with the differential currents Id1, Id2, the DC currents Ist1 and Ist2 flow from the DC sources 1.1, 1.2 directly to the output capacitor 2.9. The DC output current Idc is equal to the sum of the DC current and the differential current and is positive:

$$Idc = Ist1 + Id1 = Ist2 + Id2$$

In this operating mode, the differential converter acts as a step-up converter.

Case B Step-up converter, input voltage less than output voltage:

In this case, the sum of the voltages of the DC sources Ust1, Ust2 is less than the output voltage Udc, and the differential voltage Ud is negative, wherein the currents of the DC sources Ist1, Ist2 are positive, i.e. energy is transmitted from the DC sources to the DC output 3.1, 3.2.

When the second and third switches 2.62, 2.82 are switched on, negative differential currents Id1 and Id2 flow which are stored in the storage inductors 2.4, 2.5, wherein the first switch 2.72 is switched off. When the second and third switches 2.62, 2.82 are then switched off and at the same time the first switch 2.72 is switched on, the differential currents Id1, Id2 stored in the storage inductors 2.4, 2.5 flow via the first switch 2.72 to the buffer capacitor 2.20.

In parallel with the negative differential currents Id1, Id2, the positive DC currents Ist1, Ist2 flow from the DC output 3.1, 3.2 directly to the DC sources 1.1, 1.2; in this case, the differential currents Id1 and Id2 flow in the opposite direction to the DC currents Ist1 and Ist2, respectively, wherein the DC output current Idc is nevertheless positive.

In this operating mode, the differential converter acts in the same way as a step-up converter.

Case C Step-down converter, voltages at DC sources lower than output voltage:

In this case, the sum of the voltages at the DC sources Ust1, Ust2 is lower than the output voltage Udc, the differential voltage Ud is negative, and the DC currents from the DC sources Ist1, Ist2 and the DC output current Idc are negative, i.e. energy flows from the DC output 3.1, 3.2 into the DC sources 1.1, 1.2. When the second and third switches 2.62, 2.82 are switched on, negative differential currents Id1 and Id2 flow, which are stored in the storage inductors 2.4, 2.5; the first switch 2.72 is switched off. When the second and third switches 2.62, 2.82 are switched off and at the same time the first switch 2.72 is switched on, the differential currents Id1, Id2 stored in the storage inductors 2.4, 2.5 flow via the first switch 2.72 to the buffer capacitor 2.20. In parallel with the negative differential currents Id1 and Id2, the DC currents Ist1 and Ist2 flow from the DC output 3.1, 3.2 to the DC sources 1.1, 1.2 and charge said DC sources. In this case, the differential currents Id1 and Id2 and the DC currents Ist1, Ist2 are rectified and negative and the differential converter acts as a step-down converter.

Case D Step-down converter, voltages at DC sources greater than output voltage:

In this case, the sum of the voltages at the DC sources Ust1, Ust2 is greater than the DC output voltage Udc, the differential voltage Ud is positive and both the DC currents of the DC sources Ist1, Ist2 and the DC output current Idc are negative, i.e. energy flows from the DC output 3.1, 3.2 into the DC sources 1.1, 1.2 and the DC sources 1.1, 1.2 are charged. When the second and third switches 2.62, 2.82 are switched on, positive differential currents Id1, Id2 flow, which are stored in the storage inductors 2.4, 2.5. The first switch 2.72 is in this case switched off. When the second and third switches 2.62, 2.82 are switched off and at the same time the first switch 2.72 is switched on, the differential currents Id1, Id2 stored in the storage inductors 2.4, 2.5 flow via the first switch 2.72 to the buffer capacitor 2.20. In parallel with the positive differential currents Id1, Id2, the DC currents Ist1, Ist2 flow from the DC output 3.1, 3.2 to the DC sources 1.1, 1.2. In this case, the differential currents Id1, Id2 and the currents of the DC sources Ist1, Ist2 flow in the opposite direction and the output current Idc is negative.

As a result of the described operating modes of the differential converter, it is clear that the voltage of each DC source 1.1, 1.2 can assume values of between zero and the maximum DC voltage Udc. The direction of the DC currents Ist1 and Ist2 of the DC sources 1.1, 1.2 can assume both positive values (discharge) and negative values (charge).

One embodiment of the arrangement described herein proposes that the output capacitor 2.9 and the buffer capacitor 2.20 together with the first and second storage inductors 2.4, 2.5 form a filter which ensures that the harmonics, caused by the work of the electronic switches 2.62, 2.72, 2.82, do not appear at the DC sources 1.1, 1.2 and disrupt said DC sources, and that the output capacitor 2.9 together with the storage inductors 2.4, 2.5 forms an output filter which ensures that the harmonics, caused by the work of the electronic switches 2.62, 2.72, 2.82, do not appear at the DC output 3.1, 3.2.

Figure 6:
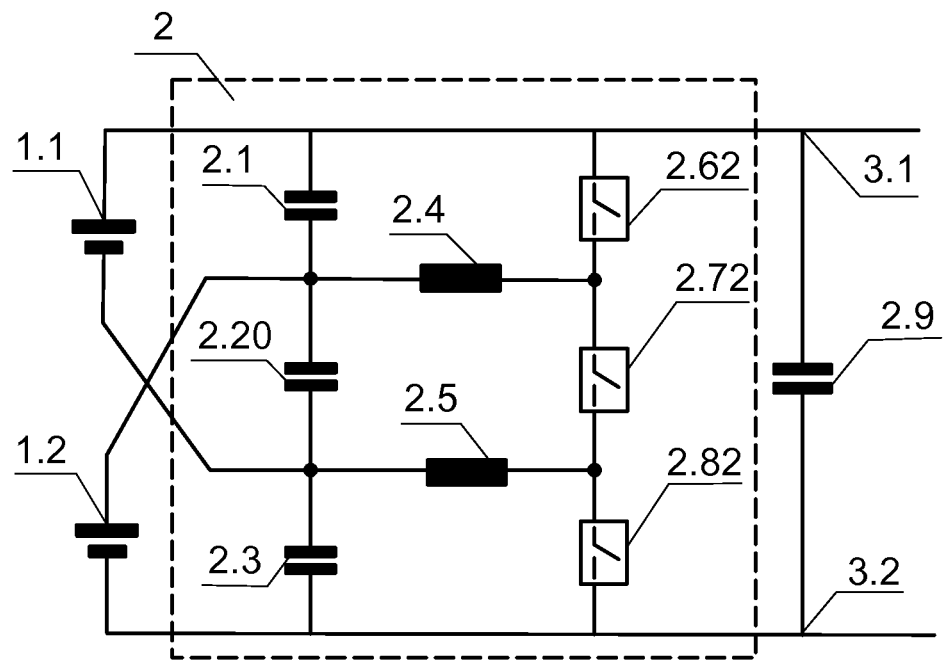
FIG. 6 shows an embodiment of the bidirectional DC-to-DC converter with additional capacitors.

In a further embodiment, as shown in FIG. 6, provision is made for the bidirectional DC-to-DC converter to have an additional capacitor 2.1 between the positive connection of the first DC source 1.1 and the positive connection of the second DC source 1.2 and an additional capacitor 2.3 between the negative connection of the first DC source 1.1 and the negative connection of the second DC source 1.2, wherein these two additional capacitors 2.1, 2.3 intensify the filtering effect of the output capacitor 2.9 and the buffer capacitor 2.20 on the harmonics, caused by the work of the electronic switches 2.62, 2.72, 2.82, with the result that these harmonics do not appear at the two DC sources 1.1, 1.2 or at the DC output 3.1, 3.2. The filtering effect also has the result that the electromagnetic radiation (EMC loading) of the external wiring (not shown in the figures) can be avoided.

Figure 7:
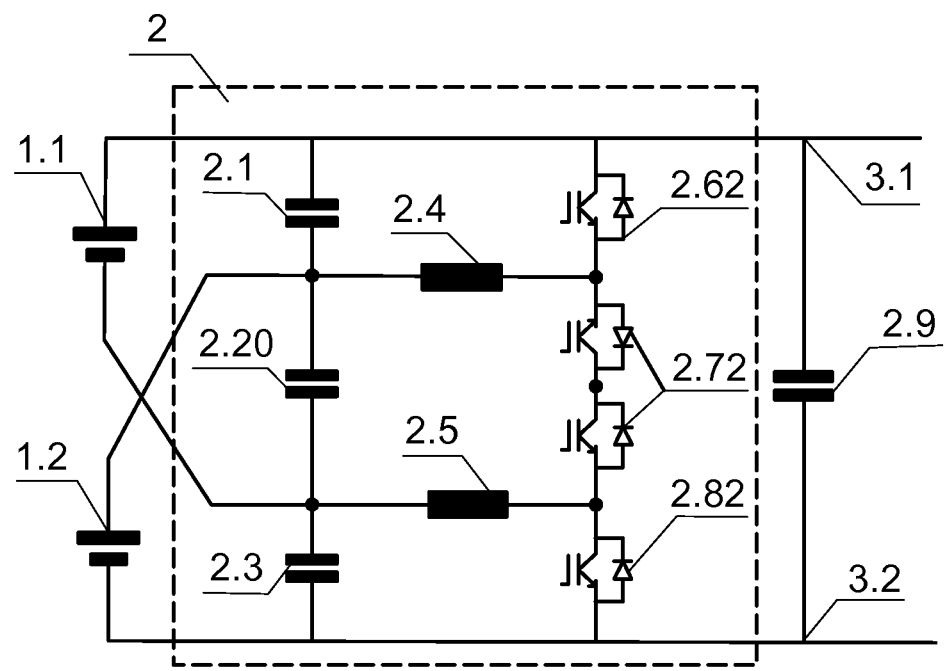
FIG. 7 shows a further embodiment of the bidirectional DC-to-DC converter with electronic switches.

The further embodiment in FIG. 7 differs from that in FIG. 6 merely in terms of the choice of first, second and third switches 2.72, 2.62, 2.82. The differential converter is in this case designed to have forcibly commutated electronic switches 2.72, 2.62, 2.82, for example transistors, IGBTs, MOSs, IGCTs. These switches are preferably equipped with anti-parallel diodes. In each case one transistor with a diode is sufficient for the bidirectional second and third switches 2.62, 2.82, and two anti-series transistors with a diode are provided for the first switch 2.72.

In addition to the above, it is also conceivable for the first and second DC sources 1.1, 1.2 to comprise in each case one or more parallel solar panels with series-connected solar cells, and for the first and second DC currents Ist1, Ist2 to be regulated, via the variation in the differential voltage Ud or by switching of the electronic switches 2.62, 2.72, 2.82, in such a way that the DC sources 1.1, 1.2 emit the maximum PV power at the DC output 3.1, 3.2 (MPP working point).

The setting of the MPP working point is achieved by the modulation of the switches 2.62, 2.72, 2.82 of the differential converter. The DC source voltage, also referred to as the string voltage, Ust1, Ust2 can vary from zero up to the maximum DC output voltage Udc. The working range of the string voltage can be enlarged by the additional variation of the DC output voltage Udc. At low temperatures, Udc can be increased since the solar cell voltage increases. Correspondingly, at high temperatures the DC output voltage Udc can be reduced.

Figure 8:
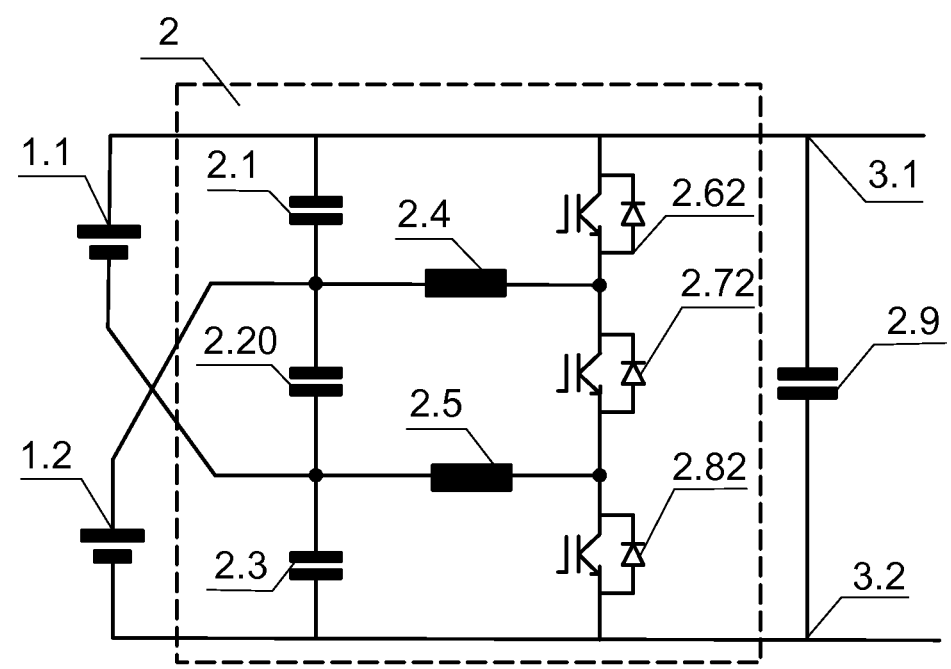
FIG. 8 shows a further embodiment of the bidirectional DC-to-DC converter, likewise with electronic switches.

If the voltages of the DC sources 1.1, 1.2 vary at most by 50% of the value of the DC output voltage Udc, the working point of the differential converter in the step-up converter operating mode can be selected such that the differential voltage Ud across the buffer capacitor 2.20 can only assume positive values. As shown in FIG. 8, it is possible in this case for the first switch 2.72 to be formed only from a transistor with a diode. The differential currents Id1, Id2 can assume both positive and negative values.

Figure 9:
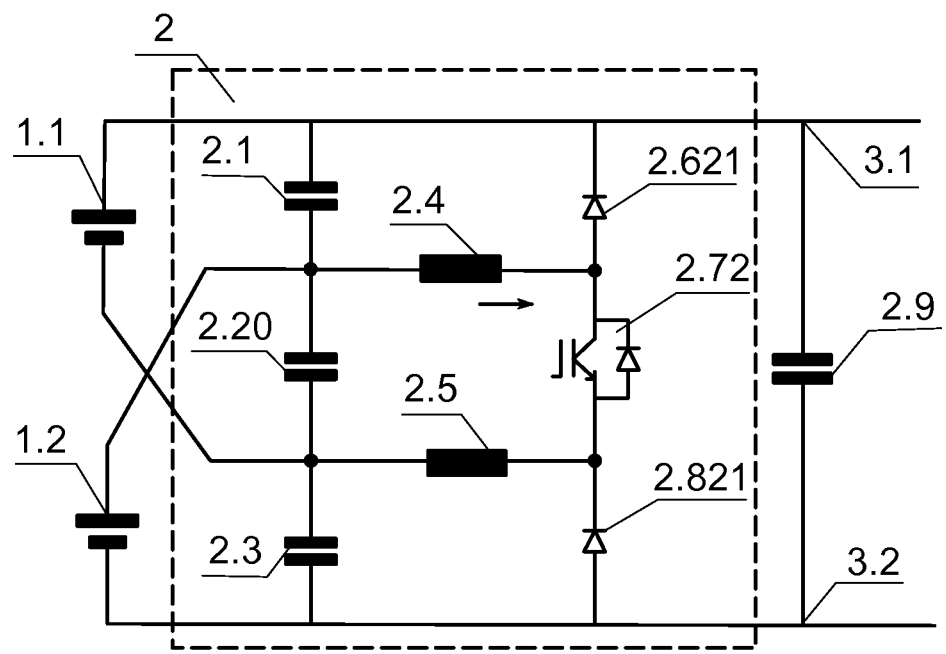
FIG. 9 shows a further embodiment of the bidirectional DC-to-DC converter with diodes arranged in parallel with an output capacitor.

When the voltages of the DC sources 1.1, 1.2 vary at most by 50% of the value of the DC output voltage Udc, the working point of the differential converter in the step-up converter operating mode can be selected such that the differential voltage Ud across the buffer capacitor 2.20 and the differential currents Id1 and Id2 can assume only positive values. As shown in FIG. 9, it is possible in this case for the second and third switches 2.621, 2.821 to be formed only from diodes and only for the first switch 2.72 to comprise a transistor with a diode.

Figure 10:
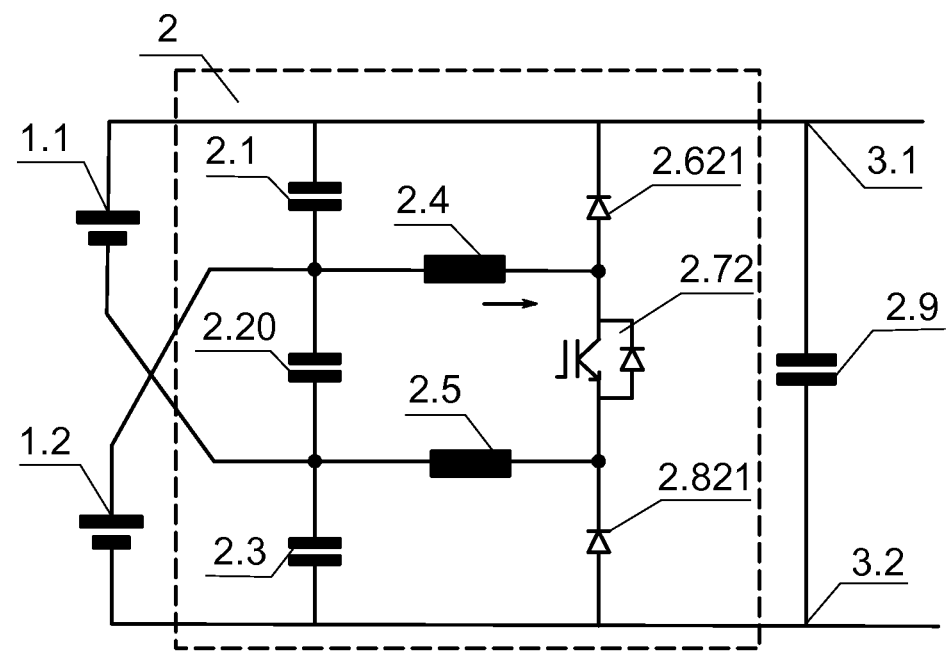
FIG. 10 shows a plurality of bidirectional DC-to-DC converters on a DC bus with a central DC-to-AC converter.

FIG. 10 shows an arrangement of a plurality of differential converters 6.1, 6.2, which can be accommodated in one or more string distributors 7 close to the DC source pairs 1.10, 1.20 and 1.30, 1.40. Since the losses of the differential converters 6.1, 6.2 and the hardware complexity involved are less considerable than those for conventional arrangements, forced cooling can be dispensed with. It is also possible for a plurality of differential converters 6.1, 6.2 to be combined by virtue of said differential converters being connected in parallel to common DC rails (DC cables) 3.3, 3.4.

The voltage of each individual string of the DC source pair 1.10, 1.20 and 1.30, 1.40 is stepped up to a higher DC voltage and then connected to a central DC-to-AC converter 3 via the DC rails 3.3, 3.4; the transmission of the PV power to the DC-to-AC converter 3 is performed by means of an increased DC voltage Udc, i.e. the DC current Idc to be transmitted decreases. As a result, the cross section of the DC rails 3.3, 3.4 and/or the $I^2R$ transmission losses can be reduced. The DC-to-AC converter 3 is likewise less expensive since the increased DC output voltage Udc enables higher AC voltages Uac to the power supply system 4 and lower system currents.

What is claimed is:

1. A bidirectional DC-to-DC converter for converting electrical energy from a first DC source and a second DC source, comprising:

an output capacitor configured to provide an output voltage, wherein a positive contact of the first DC source is connected to a positive DC output of the bidirectional DC-to-DC converter and a connection of the output capacitor, and a negative contact of the second DC source is connected to a negative DC output of the bidirectional DC-to-DC converter and the second connection of the output capacitor;

a first and a second storage inductor, wherein the first storage inductor is arranged between a positive connection of the second DC source and a first contact of a first electronic switch, and wherein the second storage inductor is arranged between a negative connection of the first DC source and a second contact of the first electronic switch;

a buffer capacitor arranged between the negative output of the first DC source and the positive output of the second DC source;

a second electronic switch and a third electronic switch arranged in series with the first electronic switch, wherein the second electronic switch is arranged between the first contact of the first electronic switch and the positive DC output, and the third electronic switch is arranged between the second contact of the first electronic switch and the negative DC output, wherein by switching on and off the first, second or third electronic switch, a differential voltage across the buffer capacitor can be regulated, and a first DC current of the first DC source and a second DC current of the second DC source from the first and second DC source to the DC output or from the DC output to the first and second DC source can be set.

2. The bidirectional DC-to-DC converter as claimed in claim 1 configured such that, by controlling the differential voltage of the buffer capacitor, a first differential current across the first storage inductor and a second differential current across the second storage inductor can be set.

3. The bidirectional DC-to-DC converter as claimed in claim 2, wherein the voltages of the first and second DC source are variable from zero to the maximum value for the output voltage, an output current at the positive or negative DC output, the first and second differential current and the differential voltage can assume positive or negative values.

4. The bidirectional DC-to-DC converter as claimed in claim 1, wherein the output capacitor and the buffer capacitor together with the first and second storage inductors form a filter, which ensures that the harmonics, caused by the work of the electronic switches, do not appear at the DC sources and disrupt said DC sources, and in that the output capacitor, together with the storage inductors, forms an output filter which ensures that the harmonics, caused by the work of the electronic switches, do not appear at the DC output.

5. The bidirectional DC-to-DC converter as claimed in claim 1, further comprising a first additional capacitor connected between the positive connection of the first DC source and the positive connection of the second DC source, and a second additional capacitor connected between the negative connection of the first DC source and the negative connection of the second DC source, wherein the first and second additional capacitors are configured to intensify the filtering effect of the output capacitor and the buffer capacitor on the harmonics, caused by the work of the electronic switches, such that these harmonics do not appear at the two DC sources or at the DC output of the bidirectional DC-to-DC converter.

6. The bidirectional DC-to-DC converter as claimed in claim 1, wherein the second and third electronic switches are each formed from forcibly commutated component with an anti-parallel diode, and wherein the first electronic switch is formed from two forcibly commutated components with anti-parallel diodes, which forcibly commutated components are connected anti-series.

7. The bidirectional DC-to-DC converter as claimed in claim 1, wherein the first and second DC sources each comprise one or more parallel solar panels with series-connected solar cells, and wherein the first and second DC currents are regulated via the variation in the differential voltage or by switching the electronic switches in such a way that the DC sources emit the maximum PV power at the DC output.

8. The bidirectional DC-to-DC converter as claimed in claim 1, configured such that the differential voltage across the buffer capacitor can assume only positive values, and the first electronic switch is formed from a forcibly commutated component with an antiparallel diode.

9. The bidirectional DC-to-DC converter as claimed in claim 1, configured such that both the differential voltage across the buffer capacitor and the differential current only assume positive values, the second and third electronic switches are each formed from a diode, and wherein the first electronic switch is formed from a forcibly turned-off switch with or without an anti-parallel diode.

* * * * *